United States Patent [19]

McDermott et al.

[11] 4,377,085

[45] Mar. 22, 1983

[54] FEMALE DIES AND METHOD OF MANUFACTURE

[75] Inventors: Richard P. McDermott, Troy; Ernest J. Brown, Birmingham, both of Mich.

[73] Assignee: W-F Industries, Inc., Centerline, Mich.

[21] Appl. No.: 140,843

[22] Filed: Apr. 16, 1980

[51] Int. Cl.³ ............... B21D 37/12; B21D 37/14; B21K 5/00
[52] U.S. Cl. .......................... 72/359; 72/478; 76/107 R; 29/156.5 A; 29/416
[58] Field of Search .............. 29/156.5 A, 416; 72/478, 343, 344, 352, 353, 354, 358, 359; 76/107 R

[56] References Cited

U.S. PATENT DOCUMENTS

| | | | |
|---|---|---|---|
| 338,502 | 3/1886 | Fitzgerald | 72/478 |
| 353,929 | 12/1886 | Fitzgerald | 72/353 |
| 1,430,399 | 9/1922 | Parsons et al. | 72/343 |
| 1,982,352 | 11/1934 | Richardson | 72/352 |
| 2,125,068 | 7/1938 | Dempsey | 72/358 |
| 2,261,304 | 11/1941 | Sparks | 72/344 |
| 2,278,293 | 3/1942 | Watson | 72/478 |
| 2,526,489 | 10/1950 | Liddicoat | 72/344 |
| 3,406,555 | 10/1968 | Fuchs, Jr. | 72/353 |
| 3,815,199 | 6/1974 | Malavazos | 29/416 |
| 4,222,260 | 9/1980 | McDermott | 72/345 |

FOREIGN PATENT DOCUMENTS 90356  9/1921  Switzerland .................... 72/343

*Primary Examiner*—Daniel C. Crane
*Attorney, Agent, or Firm*—Browdy & Neimark

[57] ABSTRACT

A segmented female die for use in a closed die set comprising a pair of similar center segments and a pair of similar "half moon" shaped outside segments. The four segments also define the ejector pin opening. The die segments are prevented from relative motion between themselves by interlocks comprising closely mating protrusions and guideways which, in cooperation with other means, produce a rigid female die. The interlocks permit the use of relatively simple manufacturing techniques such as grinding as opposed to more sophisticated techniques such as electrical discharge machining.

24 Claims, 11 Drawing Figures

FEMALE DIES AND METHOD OF MANUFACTURE

This invention relates to the invention disclosed and claimed in U.S. patent application Ser. No. 905,831, filed on May 15, 1978 in the name of Richard P. McDermott (one of the joint inventors herein), entitled "WARM FORGING OF CONNECTING ROD CAPS", and now issued as U.S. Pat. No. 4,222,260, on Sept. 16, 1980. That earlier invention and this invention are used together by the common assignee, but each has utility independently of the other.

This invention pertains to segmented dies, particularly such dies for use in metal fabricating. The invention pertains more particularly to the segmented female die in a closed die set, as are used in certain forging techniques. Still more particularly, the invention pertains to such an improved female die and its method of manufacture.

A rod end cap is a part of an engine which mates with the large end of the connecting rod to join it to the crankshaft. The small end of the rod is, of course, connected to a piston.

The cap, in addition to joining the connecting rod to the crankshaft, also provides a counterweight to balance the moving mass of the piston and the connecting rod. The caps are generally crescent shaped parts, having drilled bosses at each end through which bolts pass to make the connection to similar mating structure on the connecting rod. Between the bosses there is a balancing counterweight portion.

As set forth in greater detail in said prior patent, that invention concerns a warm forging or warm forming method using a closed die set. The present invention is specifically directed to the die set.

That prior patent developed the importance of a segmented die (as opposed to a one-piece die), and the present invention is an improvement along that line. Solid dies were tried in the early stages of development of the project to which both inventions pertain, and despite great care taken as to both design and usage, these solid dies cracked and became useless under the sever loads imposed on them in producing rod end caps in a single stroke in a closed die set.

The segmented die embodiment which was used and which was preferred at that time, was divided along generally radial lines extending outwardly from the center ejector pin opening. In the present invention the female die is segmented along different lines, lines generally parallel to the major direction of extent of the rod end cap, rather than outwardly along radial lines. The theory however holds, these are also lines of maximum stress within the female die.

However, the invention also contemplates use with a segmented female die that does not have an ejector pin. Such a situation could occur in certain applications wherein the cohesion between the completed part and the punch is more than the cohesion between the completed part and the segmented female die. The punch would, in such case, remove or lift the completed part out of the female die, thus eliminating the need for an ejector pin in the female die. The invention interlock can be used with such a segmented female die which does not have an ejector pin.

Another advantage of the invention is the substantial reduction of electrical discharge machining (EDM) in the manufacture of the female die segments. Heretofore, because of the shapes of the female die segments, EDM had to be used. EDM is relatively expensive as compared to more conventional techniques, such as the grinding techniques which are used to produce female dies in accordance with the invention. Another die segment is still formed using EDMIN the commercial embodiment of the invention, as that is the only practical way to form it. However, most of the costly EDM is replaced by less costly grinding by the use of the invention.

The invention permits easy replacement of worn out or damaged segments since all segments are ground individually and then assembled. If the dies were EDM'd, it would be done as an assembly, and individual segments therein would not be interchangeable.

By examining the dies after use in production it is easy to locate those segments subjected to the highest wear rates. It is thus possible to design dies according to the invention wherein the shortest life segments are the simplest, smallest, and least expensive to make.

The elimination of the use of EDM is accomplished by the inclusion of certain slopes, angles and interlocks which are ground into the female die segments to facilitate their fitting together, their staying together under the extreme forces and stresses to which they are subjected in use, and the simultaneous use of these same certain slopes and angles to match the die to certain portions of the finished part to thereby further facilitate and simplify the manufacture of rod end caps or other parts using the invention female dies.

The above and other advantages of the invention will be pointed out or will become evident in the following detailed description and claims, and in the accompanying drawing also forming a part of the disclosure, in which:

Figure 2:
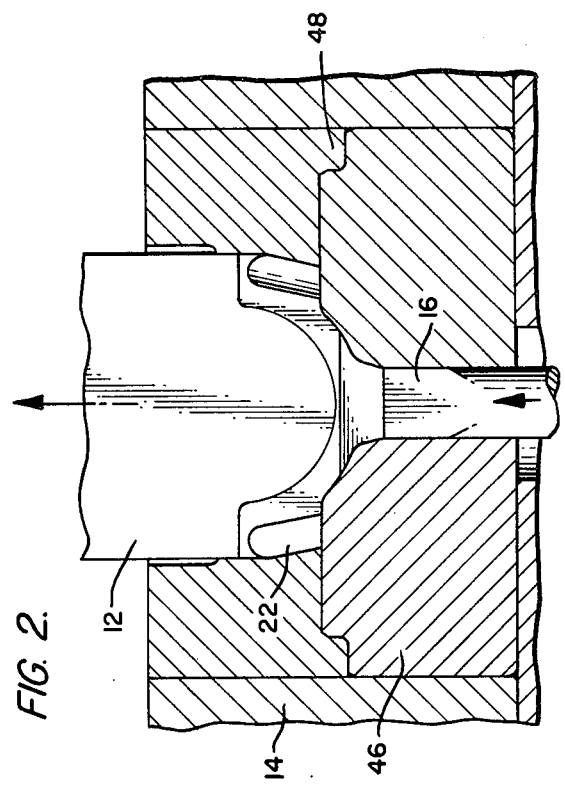
FIG. 2 is a view similar to FIG. 1 at the end of a stroke.
Figure 1:
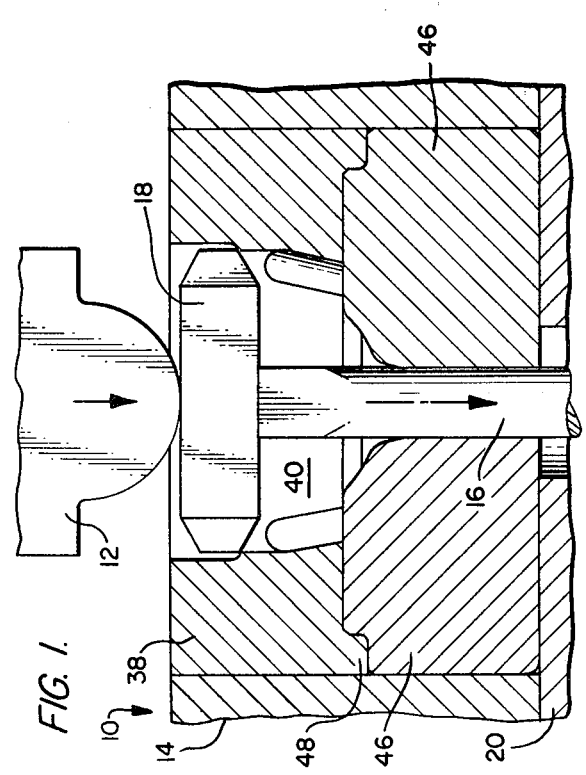
FIG. 1 is a vertical cross-sectional view with some parts shown in elevation through a die set embodying the invention, shown in position about to form a rod end cap.
Figure 3:
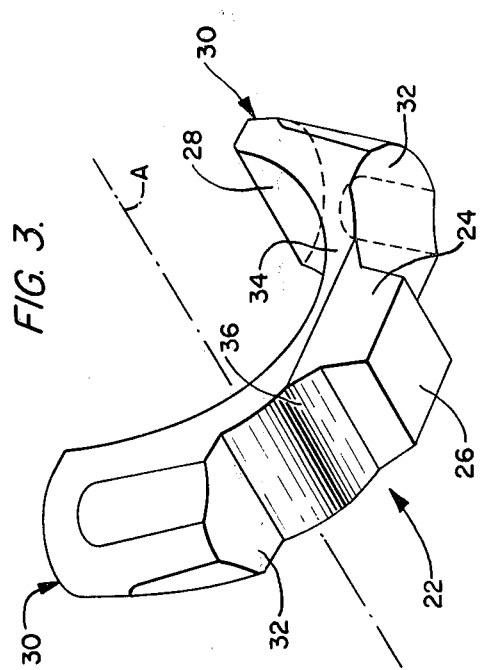
FIG. 3 is perspective view of a typical rod end cap formed using the invention.

Referring now to FIGS. 1 and 2, the invention comprises a female die assembly 10 which cooperates with a punch 12. The female die segments, described below, are housed in a retaining ring 14 which sits on a plate 20 which is in effect part of the press in which the die set is used. The die set also includes an ejector pin 16 which is operated by the press in the conventional manner or in the patented manner as taught in the McDermott Patent 4,222,260 referred to above. The die set 10 and 12 operates upon billets 18 to form rod end caps 22, shown in side elevation in FIG. 2 and in detail in FIG. 3. While the ejector is shown located centrally in FIG. 4, other off-center positions are possible dependent upon the geometry of the parts being made.

As in the earlier McDermott patent, billet 18 is also important here, but no additional or different consideration need be given.

Referring to FIG. 2, cap 22 is shown in detail. Cap 22 is typical of rod end caps which can be produced using the invention die set and female die. Other types of parts can be made using the improved die of the present invention, for example, several parts for tracked vehicles such as military tanks, track end connectors, track wedges, and center guides; chain sprockets, and gear pump impellers.

Cap 22 comprises a counterweight portion 26 opposite the bore or curved surface 28 against which the crankshaft will be received when the cap is in an engine. The cap has a curved or arcuate shape with counterweight portion 26 intermediate the ends and opposite the bore. The thickness of the cap, parallel to the axis of the crankshaft indicated by line A is uniform, except for sloped surfaces 24 which extend down to the face of the counterweight. These sloped surfaces will be discussed in greater detail below.

At the outer ends of the cap 22 are "feet" or boss portions 30 having end surfaces 32, which are later drilled to receive the bolts which attach the cap 22 to the large end of the connecting rod on the engine. Thinned or "waist" portions 36 are provided between the counterweight portion 26 and the boss portions 30. Line 34 is the intersection of the sloped surface 24 and the edge or end surfaces of the cap defining its thickness.

Figure 4:
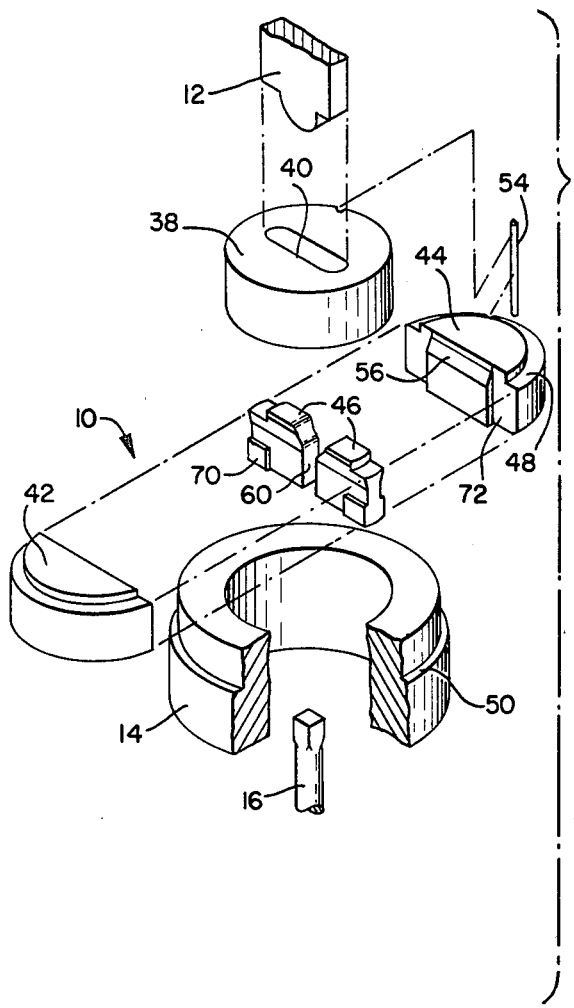
FIG. 4 is an exploded view of the female die of the invention.

Referring now to FIG. 4, the female die 10 comprises a single upper segment 38 internally formed with an opening 40 and many features of the rod end cap, as can be seen from a simultaneous examination of FIG. 2 and certain of the other FIGS. as described below. The female die is completed by a plurality of lower die segments 42, 44 and 46, which are the more important parts as to the invention.

In certain applications, a top segment which acts to form the part can be omitted entirely.

In this specification and claims the use of the words "upper" and "lower" and the like, in regard to the die segments, is solely for the sake of convenience to describe the specific embodiment shown in the drawings, and is not a limitation on the scope of protection. As is well known to those skilled in these arts, the female die "upper" and "lower" sections could be reversed. That is, the segment 38 could be at the bottom of the retainer ring 14, and the segments 42, 44 and 46 at the upper end of the retainer ring. Further, the punch and ejector pin openings could be reversed, if needed. Such a reversal of parts, (38, and 42, 44 and 46), might require that the taper in the female die be reversed, or not, depending upon the school of thought to which the particular artisan adhers in regard to this taper, as described below.

The female die lower section consists of four segments, left and right generally half circle or half moon shaped outer segments 42 and 44, and a pair of identical center segments 46. In the successfully constructed embodiment, the two segments 46 were not interchangeable because they carried different indicia to mark the parts, however they are identical otherwise. The assembled segments 42, 44, and 46 fit into and are held assembled together with top segment 38 by means of mating shoulders and ledges indicated at 48 which are formed in segment 38 and in the segments 42, 44 and 46. A ledge 50 is formed in the outside of the ring 14 to hold the assembled female die in the press. The total height of the assembled five piece female die, parts 38 and 42, 44 and 46, is substantially equal to the height of ring 14 along the line of punch travel, see FIGS. 1 and 2.

As shown in FIG. 4, the operating of functional end of the ejector pin 16 is of rectilinear cross-sectional shape in order to define the face of the counterweight portion 26. The invention, as will of course be obvious to those skilled in these arts, is not limited to manufacturing rod end caps, but can be used to make many other parts, as set forth above. Such other parts may have a surface or set of surfaces other than rectangular located at the vicinity of the ejector pin. In such case the ejector pin could be of any shape, e.g., round as is very common, oval, irregular, star shaped, or whatever. Of course, the adjacent female die segments defining the ejector pin opening will of course be suitably configured to match the particular ejector pin shape used. Further, the face of the ejector pin need not be flat, it could have a trough, or depression, or boss, or whatever formed in it to thereby define the mirror image shape in the part being formed.

The female die segments are mounted in the retainer ring 14 under a great deal of pressure, in the range of about 2 tons to about 10 tons per square inch of mating interface surface of the segments and the retaining ring, to preload the female die segments, for ease of assembly, and to hold them rigidly in place during use. To aid the pre-stress pressure towards those goals, it is also common to provide a very slight taper on the inside surface of the ring 14 and mating tapers on the die segments to further enhance the holding of the die segments in position. However, there are two conflicting schools of thought in the metal forming arts as to which way this taper should face. Some argue to have the open end up so that the die segments can be pressed firmly down into the ring, and the other school of thought argues to have the small end of the taper facing up so that the die segments cannot "escape" upwardly during use of the die, particularly on the withdrawing stroke of the punch out of the female die. The invention is amenable to use with the method of either school.

The preferred embodiment as shown in FIG. 4 is called the 2+2+1 configuration, because of the two pairs of segments in the lower section and the single upper segment 38. This particular configuration, whether mounted as shown or reversed as discussed above, is the preferred embodiment.

Other configurations are possible. For example, two segments in the bottom as opposed to four can also be used in accordance with the invention, but only if the particular unique configuration of the part to be made demands it. That is, if it is possible to do so, the 2+2+1 is preferred. However, the invention, as to the improvement of the interlock 70 and 72, could as well be used as a 2+1. That is, if the die consisted solely of two segments equivalent to the segments 42 and 44, plus another segment equivalent to segment 38, then in that case one of these "half moon" shapes would include protrusions and the other guideways, (or one protrusion and one guideway on each), whereby the invention advantages flowing from the interlocks would be retained. It might be that a 2+2+2+1 could be used wherein, for example, segments equivalent to 42 and 44 could each be two segments. However, here again, this is not deemed desirable because in addition further fitting together must be done and the cost of manufacturing such a multi-segment die would be further increased by further tolerances, fitting together, and associated care and trouble which must be taken. However, the invention does contemplate a 2+2+2+1 configuration, or any other configuration wherein the die segments can be fitted together using the invention interlocks, since any such design might be demanded by some unusally shaped part to be formed.

Segments 42 and 44 may be manufactured from a single disc of die steel. This disc is first fabricated as a round, and finished machined on all external surfaces. Then it is simply cut in half, and the additional surfaces required as at 56 and guideways 72 are formed therein. The removal of this material is done in such a way that the thickness of the center die segments 46 will make a circle so that the assembled die segments 42, 44 and 46 will again constitute a circle to fit properly within the retainer ring 14. The only difference between the two half moon segments 42 and 44 is the addition of the groove for the locating pin 54, a trivial detail.

A round retainer ring is greatly preferred because so called "hoop" stresses must be applied to the die segments within the retainer ring, and only a circular retainer can effectively impose such hoop stresses. However, it is within the contemplation, in the event of an odd situation dictated by the need to manufacture an extremely unusually shaped part, to use some other type or shape of retainer, the invention primary features of the interlocks 70 and 72 being retained even in the event of such a peculiarly shaped, externally, die set and retainer.

A Woodruff key 54 which fits into mating half circle grooves formed in die segments 38 and 44, is provided to hold the die segments in assembled relation, as is usual in these arts.

As in the prior McDermott patent, the present invention also has the advantages of locating the parting lines between the die segments along natural lines in the cap or other part being produced, whereby the parting lines do not evidently appear on the part, and further wherein these lines are along lines of maximum stress in the die. The invention also accomodates an ejector pin opening so located and dimensioned that the end surface of the counterweight portion 26 is the same as and is in fact formed by the operating end of the ejector pin 16. That is, as shown in FIG. 2, the face of the ejector pin forms part of the mold cavity and forms the face of the counterweight portion 26.

Figure 11:
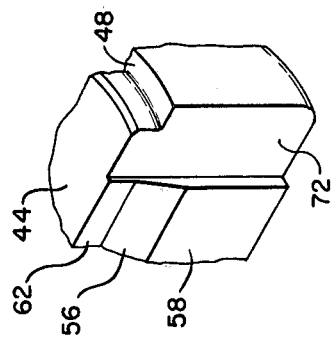
FIG. 11 is a fragmentary perspective view of one corner of the die segment shown in FIG. 8.
Figure 10:
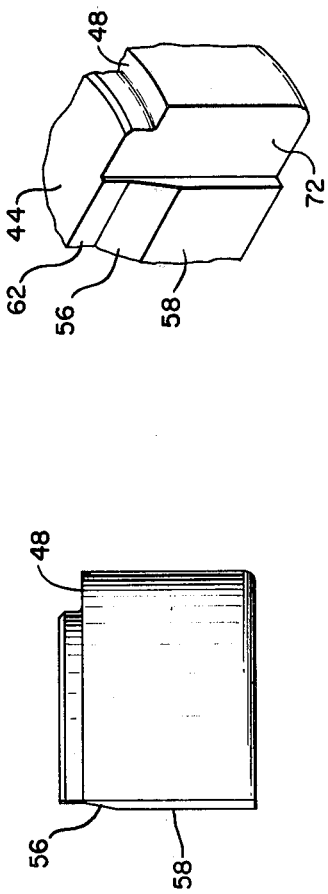
FIG. 10 is a side elevational view of the die segment shown in FIG. 8.
Figure 6:
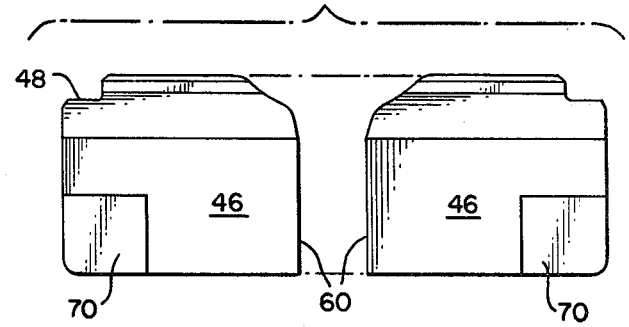
Figure 7:
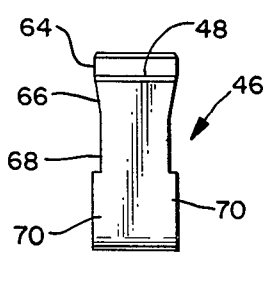
FIG. 7 is an elevational view of one of the die segments shown in FIG. 6.
Figure 8:
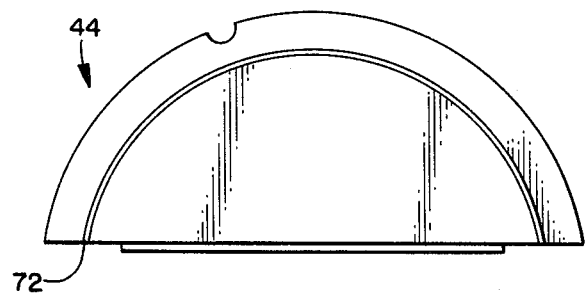
FIG. 8 is a plan view of one of the outside female die segments.
Figure 9:
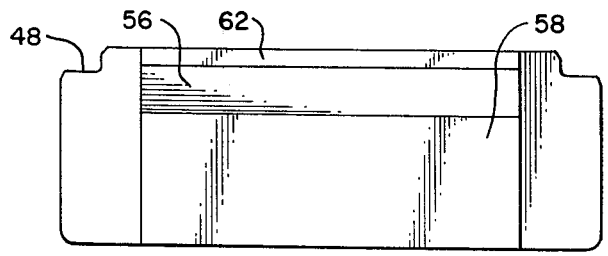
FIG. 9 is a front elevational view of the segment shown in FIG. 8.

To this end, it was found that division of the die along lines parallel to the blank 52 of the interim developed form, and with the thickness of the center segments 46 equal to the thickness of the finished part, was advantageous. Further, certain slopes and angles are formed in the die segments so that their manufacture is simplified and to permit the sloped surfaces 24 on the cap 22 to be formed. Referring to FIG. 11, surface 56 is formed on segments 44 and 42, to define the sloped surfaces 24 on the part. Surface 58 below surface 56 defines one side of the ejector pin opening, the three sides of which are defined by similar surfaces on mating segment 42 and by the end surfaces 60 on the die segments 46, see FIG. 6. The surfaces 62 on the two die segments 42 and 44 together define the overall thickness of the cap 22. This thickness, of course, matches the width of the opening 40 in upper female die segment 38. Referring to FIG. 7, each center die segment 46 is formed with a pair of top surfaces 64 which match and mate with the surfaces 62 on the end pieces 42 and 44, surfaces 66 to mate with the surfaces 56, and surfaces 68 to mate with surfaces 58 on segments 42 and 44.

As mentioned above, these surfaces 56, 58 and 62 through 68 on the mating die segments are required by the sloped surfaces 24 on the cap. A similar cap is shown in the prior McDermott patent and it does not extend up as high, but this is not critical. What is important is that the sloped surface extends upwardly and outwardly from the face of the counterweight portion 26.

Other parts, other rod end caps or completely different parts, may not have this requirement of a reduced thickness in the portion of the part defined by the bottom female die segment. In such case, all of the above described sloped surfaces could be omitted. They are provided in the manner shown for ease of manufacture of the die and of the part 22. That is, it is much simplier to grind in the surface 56 straight across the facing portions of the die segments 42 and 44 rather than to make them a shortened portion over only the space between the two center die segments 46. Having done that, the mating surfaces are required on mating die segments 46 which, again, are simply accomodated during the manufacture by grinding of these segments.

Figure 5:
FIGS. 5 and 6 illustrate the manner in which the center segments of the female die are formed from a single blank.

Means are provided to prevent the center die segments 46 from moving within their own plane with respect to outer segments 42 and 44. This motion, and its elimination, is the main problem solved by the present invention with respect to other prior art segmented dies, as well as the prior developments leading up to the present invention described above, wherein pins were used, and wherein the center segments were formed using EDM and a single blank similar to the blank 52 of FIG. 5.

To this end, the invention provides interlocks between the die segments to hold them in predetermined correct relationship to each other and to do so over prolonged periods of time equal to or greater than the useful life of the die as defined by other considerations not germane to the invention. The invention further provides efficient and simplified means of forming the interlocks on the mating female die lower segments.

To the end, each center segment 46 is formed with a pair of protrusions 70 formed in its lower outer corners. These protrusions mate with guideways, or slots, or clearance openings 72 formed in segments 42 and 44. The guideways 72 extend the full height of the segments 42 and 44 for ease of manufacture. That is, as is apparent to those skilled in the art, once the die segments 42 and 44 are made with the surfaces 62, 56 and 58 across their full length, it is then a simple matter to form the guideways 72 by simply grinding top to bottom. That is, full length simple grinding procedures are first used to form the surfaces 56, 58 and 62. Then the segment is turned to grind the guideways 72, again full distance across the segment but this time perpendicular to the surfaces 56, 58 and 62. Similarly, the center segments 46 are simply made by grinding all of the surfaces shown in the end elevational view of FIG. 7, (64, 66 and 68,) and the two surfaces defining the protrusions 70, again full length across the segment.

The interlocks as shown and described are rectilinear. However, the invention is not so limited. Interlocks having trapezoidal, rhombic or other shapes could as well be used dependent upon the particular application.

The EDM process cannot easily fabricate a sharp corner as does grinding. Thus, to that extent, grinding as used in the invention method to produce the female die segments is preferred over EDM.

In this manner, by so providing the protrusions 70 and guideways 72 to define the invention interlocks, manufacturing is greatly simplified over the EDM and the much more sophisticated and expensive techniques heretofore used.

The interlocks assure that the die segments, especially the center segments 46, are completely restrained and are not free to move in any direction. All the die segments are held against vertical movement, up and down as shown in FIG. 4, by the taper and hoop stresses which produce a heavy pressure within the ring, and by the top die member 38 and by the bottom plate 20. Relative rotation between the die segments within the ring is prevented by the key 54 and its mating grooves in the die segments. Motion of the center segments 46 with respect to the outer segments 42 and 44 is prevented by the interlocks comprising the protrusions 70 and guideways 72. Thus, a die in which no motion of any die segment relatively to any other die segment is provided to solve all of the problems in the prior art in this respect.

Another advantage of the female die of the invention, in common with that of the prior McDermott patent, is that complete die assemblies, everything shown in FIG. 4 save punch 12 and ejector 16, can be preassembled and kept on a shelf ready to be substituted into the press in the event of normal die maintenance, failure, accident, or a female die wearing out. This achieves enormous economies of manufacture in that only those segments which are worn need be replaced. Thus, the present invention has all the same advantage as in the previous McDermott patent of permitting quick changing of preassembled and "ready to go" female dies, thus avoiding excessive production down time. Ring 14 and its mounting ledge 50 permit rapid changing of such preassembled female dies. A change can be made in a few minutes.

While the invention has been described in detail above, it is to be understood that this detailed description is by way of example only, and the protection granted is to be limited only within the spirit of the invention and the scope of the following claims.

We claim:

1. A segmented female die forming part of a closed die set, said closed die set being shaped to operate upon a billet of predetermined size and volume so that the part produced from said billet substantially entirely fills the mold space within said die set, said die set consisting of said segmented female die having an outer edge defined by the periphery of said segmented female die and a mating punch, means to interlock said female die segments together in the assembled condition of said female die to prevent substantially all relative motion among said segments during use of said closed die set, said interlock means being formed entirely integrally in said female die segments, said interlock means being free of any interfitting pin and mating aperture arrangements, said integral interlock means permitting interchange of some worn one or more of said die segments for new such segment or segments after use of the assembled female die; said interlock means comprising at least a pair of protrusions and a corresponding number of mating guideways, each of said protrusions being of essentially rectilinear cross-sectional shape when viewed in a plane parallel to the direction of punch motion; said interlock means being located in the facing surfaces between at least two of said female die segments, said facing surfaces being positioned generally parallel to said direction of punch motion with respect to said female die, all of said protrusions and said guideways being so positioned on their respective die segments that they snugly fit together in the assembled together condition of said female die, each said protrusion extending to an outer edge of its respective die segment, all of said segments defining a shape which when viewed in a plane perpendicular to said direction of punch motion is generally a conical section, and said conical section shape being divided into said segments by lines which are generally chordal to said conical section shape.

2. The combination of claim 1, an ejector pin cooperable with a through opening defined by at least one of the segments of said female die, said ejector pin defining a portion of the mold cavity within said die set in the retracted position of said ejector pin into said segmented female die.

3. The combination of claim 1, a ring for retaining the assembled and interlocked female die segments, and wherein said segments are pressed into said ring with a pressure in the range of about 2 tons to about 10 tons per square inch of mating interface surface of said segments and the retaining ring.

4. The combination of claim 1, said segmented female die comprising at least one upper die segment and at least two lower die segments, an external member for containing all of said upper and lower die segments, and said interlock means protrusions formed on at least one of said lower die segments and said mating guideways formed on at least one of said lower die segments to snugly receive said protrusions respectively.

5. The combination of claim 1, said female die being generally circular and comprising at least one upper die segment and a plurality of lower die segments, and the mold cavity defined by said female die segments being formed at least in part in said at least one upper die segment and in at least some of said plurality of lower die segments.

6. The combination of claim 1, each said protrusion having a dimension measured parallel to the direction of punch motion less than the dimension of its respective die segment likewise measured parallel to said direction of punch motion.

7. A segmented female die forming part of a closed die set, said female die being adapted to cooperate with a punch, at least some of the segments of said female die defining a through opening for receiving an ejector pin, said die being adapted to form a part having at least one face formed by an end of said ejector pin, whereby said ejector pin end defines a portion of the mold cavity when said ejector pin is in its fully retracted position into said female die, said closed die set being shaped to operate upon a billet of predetermined size and volume so that the part produced from said billet substantially entirely fills the mold space within said die set, said die set consisting of said segmented female die having an outer edge defined by the periphery of said segmented female die and a mating punch, means to interlock said female die segments together in the assembled condition of said female die to prevent substantially all relative motion among said segments during use of said closed die set, said interlock means being formed entirely integrally in said female die segments, said interlock means being free of any interfitting pin and mating aperture arrangements, said integral interlock means permitting interchange of some worn one or more of said die segments for new such segment or segments after use of the assembled female die; said interlock means comprising at least a pair of protrusions and a corresponding number of mating guideways, each of said protrusions being of essentially rectilinear cross-sectional shape when viewed in a plane parallel to the direction of punch motion; said interlock means being located in the facing surfaces between at least two of said female die segments, said facing surfaces being positioned generally parallel to said direction of punch motion with respect to said female die, all of said protrusions and said guideways being so positioned on their respective die segments that they snugly fit together in the assembled together condition of said female die, each said protrusion extending to an outer edge of its respective die segment, all of said segments defining a shape which when viewed in a plane perpendicular to said direction of punch motion is generally a conical section, and said conical section shape being divided into said segments by lines which are generally chordal to said conical section shape.

8. The combination of claim 7, said segmented female die comprising an upper die segment and four lower die segments, said ejector pin opening being of rectilinear cross-sectional shape and being defined by said lower die segments only, said part comprising a counterweight portion defined by said lower die segments and said ejector pin end, said counterweight portion comprising a face defined by said ejector pin end and comprising sloped side surfaces which begin at said face and are inclined away from each other moving away from said face towards other parts of said part, said lower die segments comprising a pair of center segments and left and right generally half circle shaped segments, and said center segments and said half circle segments being formed with at least partially mating oppositely sloped surfaces adapted to form said sloped side surfaces of said part.

9. The combination of claim 8, said interlock means pair of protrusions extending from said center segments towards said mating guideways formed in said half circle shaped segments.

10. The combination of claim 8, said center segments being substantially identical to each other and said half circle segments being substantially identical to each other.

11. The combination of claim 8, said half circle segments being partially truncated, and said four segments together with said ejector pin opening comprising a substantially full circle.

12. The combination of claim 1, wherein said mold cavity defined by the ejector pin and die set is configured to form said part comprising an internal combustion engine connecting rod end cap.

13. The combination of claim 7, said segmented female die comprising at least one upper die segment and at least two lower die segments, an external member for containing all of said upper and lower die segments, and said interlock means protrusions formed on at least one of said lower die segments and said mating guideways being formed on at least one of said lower die segments.

14. The combination of claim 7, said segmented female die comprising an upper die segment and four lower die segments, said ejector pin opening being of rectilinear cross-sectional shape and being defined by said lower die segments only, said part comprising a counterweight portion defined by said lower die segments and said ejector pin end, said counterweight portion comprising a face defined by said ejector pin end and comprising sloped side surfaces which begin at said face and are inclined away each other moving away from said face towards other parts of said part, said lower die segments comprising a pair of center segments and left and right generally half circle shaped segments, and said center segments and said half circle segments being formed with at least partially mating oppositely sloped surfaces adapted to form said sloped side surfaces of said part.

15. The combination of claim 14, said interlock means comprising a pair of protrusions extending from said center segments towards said mating guideways formed in said half circle shaped segments.

16. The combination of claim 14, said center segments being substantially identical to each other and said half circle segments being substantially identical to each other.

17. The combination of claim 14, said half circle segments being partially truncated, and said four segments together with said ejector pin opening comprising a substantially full circle.

18. The combination of claim 17, and a ring for retaining the assembled and interlocked female die segments, and wherein said segments are pressed into said ring with a pressure in the range of about 2 tons to about 10 tons per square inch of mating interface surface of the segments and the retaining ring.

19. The combination of claim 7, said female die being generally circular and comprising at least one upper die segment and a plurality of lower die segments, and the mold cavity defined by said female die segments being formed at least in part in said at least one upper die segment and in at least some of said plurality of lower die segments.

20. A method of making a circular pre-assembled segmented female die for use in a closed die set, said closed die set being shaped to operate upon a billet of predetermined size and volume so that the part produced from said billet substantially entirely fills the mold space within said die set, said die set consisting of said segmented female die having an outer edge defined by the periphery of said segmented female die and a mating punch, the method comprising the steps of preparing a disc of die material substantially equal to the size of the completed segmented female die, cutting said disc in half, removing material from the cut face of each half, preparing center segments having a size substantially equal to the material removed from said disc, whereby all of said segments when assembled together will have a size substantially equal to the size of said disc and will be defined by lines which are generally chordal to said disc, providing interlock means between said halves and said segments, said interlock means in said halves being formed integrally therein during the aforementioned removing material step, making said interlock means free of any interfitting pin and mating aperature arrangements, said integral interlock means permitting interchange of some worn or more of said die segments for new such segment or segments after use of the assembled female die, forming said interlock means of at least a pair of protrusions and a corresponding number of mating guideways with each of said protrusions being of essentially rectilinear cross-sectional shape when viewed in a plane parallel to the direction of punch motion, locating said interlock means in the facing surfaces between at least two of said female die segments, positioning said facing surfaces generally parallel to the punch motion with respect to said female die, positioning all of said protrusions and said guideways on their respective die segments so that they snugly fit together in the assembled together condition of said female die, extending each of said protrusion to an outer edge of its respective die segment, assembling and interlocking said segments together, and mounting the assembled interlocked segments into a retainer ring adapted to fit into a press in which said assembled die is to be used.

21. The method of claim 20, wherein said segments are pressed into said ring with a pressure in the range of about 2 tons to about 10 tons per square inch of mating interface surface of the segments and the retaining ring.

22. The method of claim 20, and providing an ejector pin opening between said segments in the assembled and interlocked condition of said female die.

23. The method of claim 22, providing an upper die segment and four lower die segments in said segmented female die, said ejector pin opening being of rectilinear cross-sectional shape and being defined by said lower die segments only, said part comprising a counterweight portion defined by said lower die segments and said ejector pin end, said counterweight portion comprising a face defined by said ejector pin end and comprising sloped side surfaces which begin at said face and are inclined away each other moving away from said face towards other parts of said part, forming said counterweight portion and said sloped surfaces with means in said lower die segments, said lower die segments comprising a pair of center segments and left and right generally half circle shaped segments, and said last mentioned means comprising sloped surfaces formed in said half circle segments and at least partially mating oppositely sloped surfaces formed in said center segments.

24. The method of claim 20, wherein said steps of preparing a disc, preparing said center segments, removing material, and providing interlock means are performed using grinding techniques substantially exclusively.

* * * * *